(12) United States Patent
Kaufmann et al.

(10) Patent No.: US 12,036,503 B2
(45) Date of Patent: Jul. 16, 2024

(54) FILTER ELEMENT AND FILTER SYSTEM

(71) Applicant: MANN+HUMMEL GmbH, Ludwigsburg (DE)

(72) Inventors: Michael Kaufmann, Meckenheim (DE); Klaus-Dieter Ruhland, Meckenheim (DE); Markus Wagner, Arnstorf (DE); Philipp Hettkamp, Steinheim (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 294 days.

(21) Appl. No.: 17/541,475

(22) Filed: Dec. 3, 2021

(65) Prior Publication Data

US 2022/0088528 A1  Mar. 24, 2022

Related U.S. Application Data

(63) Continuation of application No. PCT/EP2020/063013, filed on May 11, 2020.

(30) Foreign Application Priority Data

Jun. 7, 2019  (DE) ...................... 10 2019 115 568.1

(51) Int. Cl.
*B01D 46/52* (2006.01)
*B01D 45/16* (2006.01)
(Continued)

(52) U.S. Cl.
CPC .......... *B01D 46/523* (2013.01); *B01D 45/16* (2013.01); *B01D 46/0006* (2013.01);
(Continued)

(58) Field of Classification Search
CPC ...... B01D 46/523; B01D 50/20; B01D 46/16; B01D 46/0006; B01D 2265/04; B01D 2271/025; B01D 2271/027; B01D 2279/60
(Continued)

(56) References Cited

U.S. PATENT DOCUMENTS 5,071,555 A   12/1991  Enbom
5,236,480 A   8/1993   Svensson et al.
(Continued)

FOREIGN PATENT DOCUMENTS

CN  102600685 A  7/2012
CN  203009110 U  6/2013
(Continued)

*Primary Examiner* — Robert A Hopkins
*Assistant Examiner* — Qianping He (57) ABSTRACT

A filter element for filtering a fluid has a frame and a filter bellows provided with a filter medium folded in a zigzag shape to folds. The filter bellows has an inflow face at a raw side of the filter bellows and an outflow face at a clean side of the filter bellows. The filter bellows is arranged in the frame. A seal is arranged circumferentially at least partially continuously at least in sections at an outer circumferential side of the filter medium at the inflow face of the filter bellows or at the outflow face of the filter bellows. Elongate adhesive sections are arranged along at least two adhesive tracks on the filter medium at the inflow face of the filter bellows and/or at the outflow face of the filter bellows. Strain-relief devices for compensating a length change of the at least two adhesive tracks in relation to the filter medium and/or to the seal are provided. A filter system is provided with such a filter element.

23 Claims, 8 Drawing Sheets

(51) Int. Cl.
*B01D 46/00* (2022.01)
*B01D 50/20* (2022.01)

(52) U.S. Cl.
CPC .......... *B01D 50/20* (2022.01); *B01D 2265/04* (2013.01); *B01D 2271/025* (2013.01); *B01D 2271/027* (2013.01); *B01D 2279/60* (2013.01)

(58) Field of Classification Search
USPC .......................................................... 55/337
See application file for complete search history.

(56) References Cited

U.S. PATENT DOCUMENTS

| | | | |
|---|---|---|---|
| 5,804,014 | A | 9/1998 | Kishi et al. |
| 5,888,262 | A | 3/1999 | Kahler |
| 6,176,890 | B1 | 1/2001 | Svedlind et al. |
| 2003/0075500 | A1 | 4/2003 | Kleinguenther et al. |
| 2009/0209190 | A1 | 8/2009 | Gould |
| 2012/0223008 | A1 | 9/2012 | Mbadinga-Mouanda et al. |
| 2013/0133517 | A1* | 5/2013 | Gehwolf ................ C08L 67/02 95/285 |
| 2016/0016100 | A1 | 1/2016 | Mouanda et al. |
| 2016/0214053 | A1 | 7/2016 | Schwartz |
| 2017/0096971 | A1* | 4/2017 | Kaufmann ............. B01D 45/16 |
| 2017/0165601 | A1 | 6/2017 | Wuebbeling et al. |
| 2017/0182448 | A1 | 6/2017 | Sudermann et al. |
| 2017/0368488 | A1 | 12/2017 | Wall |
| 2018/0056225 | A1* | 3/2018 | Dirnberger ............. B01D 39/18 |
| 2018/0169559 | A1 | 6/2018 | Kloss et al. |
| 2018/0207566 | A1 | 7/2018 | Stanhope et al. |
| 2018/0339254 | A1 | 11/2018 | Kaufmann et al. |
| 2018/0345201 | A1 | 12/2018 | Krull et al. |
| 2021/0129068 | A1 | 5/2021 | Canfield et al. |
| 2022/0088528 | A1 | 3/2022 | Kaufmann et al. |
| 2023/0018205 | A1 | 1/2023 | Voss |

FOREIGN PATENT DOCUMENTS

| | | | |
|---|---|---|---|
| CN | 204246998 | U | 4/2015 |
| CN | 204246998 | U * | 4/2015 |
| CN | 204380440 | U | 6/2015 |
| CN | 111514678 | A | 8/2020 |
| DE | 1299230 | B | 7/1969 |
| DE | 4201702 | A1 | 7/1993 |
| DE | 102009040202 | A1 | 4/2011 |
| DE | 102010025971 | A1 | 1/2012 |
| DE | 102010032295 | A1 | 1/2012 |
| DE | 102015011339 | A1 | 3/2016 |
| DE | 102016217458 | A1 | 3/2018 |
| DE | 102017221592 | A1 | 6/2019 |
| EP | 0867216 | A1 | 9/1998 |
| KR | 20070010534 | A | 1/2007 |
| KR | 20070010535 | A | 1/2007 |
| WO | 9302769 | A1 | 2/1993 |
| WO | 9928012 | A1 | 6/1999 |
| WO | 02055179 | A1 | 7/2002 |
| WO | 2017/133796 | A1 | 8/2017 |
| WO | 18158387 | A1 | 9/2018 |
| WO | 20026179 | A2 | 2/2020 |

\* cited by examiner

FILTER ELEMENT AND FILTER SYSTEM

CROSS-REFERENCE TO RELATED APPLICATIONS

This application is a continuation application of international application No. PCT/EP2020/063013 having an international filing date of 11 May 2020 and designating the United States, the international application claiming a priority date of 7 Jun. 2019 based on prior filed German patent application No. 10 2019 115 568.1, the entire contents of the aforesaid international application and the aforesaid German patent application being incorporated herein by reference.

BACKGROUND OF THE INVENTION

The invention concerns a filter element for filtering a fluid, in particular for use as air filter of an internal combustion engine or as interior air filter, in particular of a motor vehicle, as well as a filter system with a filter element.

WO 2017/133796 A1 discloses a filter element of a filter for in particular gaseous fluid, in particular air, in particular of an internal combustion engine, in particular of a motor vehicle and/or of a machine. The filter element can be installed in an installation direction that extends parallel or coaxial to an installation axis into a filter housing of the filter. The filter element comprises at least one filter bellows with at least one filter medium. At axially oppositely positioned sides in relation to an element axis that extends perpendicularly or transversely to the installation axis, the filter bellows comprises a flow-through side for the fluid, respectively. The filter element comprises at least one seal which, in relation to the element axis, is arranged circumferentially at least partially continuously at least in sections at a radially outer circumferential side of the filter element in relation to the element axis.

SUMMARY OF THE INVENTION

It is an object of the invention to provide an improved filter element for filtering a fluid that exhibits a long service life with high reliability in operation.

A further object is to provide a filter system for filtering a fluid for receiving such an exchangeable filter element.

The aforementioned object is solved according to an aspect of the invention by a filter element for filtering a fluid, in particular air, with at least one filter bellows with a filter medium folded in a zigzag shape, with a raw-side inflow face and a clean-side outflow face, wherein the filter bellows is arranged in a frame, in particular a reinforcement frame, and preferably connected thereto, in particular is connected to the frame at the raw-side inflow face and/or at the clean-side outflow face, with at least one seal, which is arranged circumferentially at least partially continuously at least in sections at an outer circumferential side of the filter medium at the inflow face or at the outflow face of the filter bellows and which is preferably connected to the frame, in particular by means of form fit elements, preferably connected to the reinforcement frame by at least partially circumferentially extending interlocking ribs or interlocking openings of the reinforcement frame, in particular connected to the reinforcement frame by casting on, foaming on or molding on, wherein a plurality of elongate adhesive sections are arranged on the filter medium along at least two adhesive tracks at the inflow face and/or at the outflow face of the filter bellows, characterized in that the filter element comprises strain-relief means for compensation of a length change of the adhesive tracks in relation to the filter medium and/or to the seal. The employed adhesive is in general and preferably a thermoplastic hot melt of polyamide or polyester that, by means of applicator nozzles, is applied in the plastified state and hardens upon cooling. In other words, the adhesive section in the hardened state is then a bead-shaped plastic section.

The further object according to a further aspect of the invention is solved by a filter system for filtering a fluid with a filter housing, which comprises at least one inlet for inflow of the fluid flow and at least one outlet for outflow of the purified fluid flow, and with a filter element for filtering the fluid that is exchangeably arranged in the filter housing between a raw side and a clean side, with at least one filter bellows with a filter medium folded in a zigzag shape, with a raw-side inflow face and a clean-side outflow face, which filter bellows is arranged in a reinforcement frame arranged at the clean side, with at least one seal, which is arranged circumferentially at least partially continuously at least in sections at an outer circumferential side of the filter medium at the inflow face or at the outflow face of the filter bellows and which is connected to the reinforcement frame by means of at least partially circumferentially extending interlocking ribs, in particular connected to the reinforcement frame by casting on or molding on, wherein a plurality of elongate adhesive sections are arranged on the filter medium along at least two adhesive tracks at the inflow face and/or at the outflow face of the filter bellows, characterized in that the filter element comprises strain-relief means for compensation of a length change of the adhesive tracks in relation to the filter medium and/or to the seal.

Beneficial embodiments and advantages of the invention result from the additional claims, the description, and the drawing.

A filter element for filtering a fluid, in particular air, is proposed with at least one filter bellows with a filter medium folded in a zigzag shape, with a raw-side inflow face and a clean-side outflow face, wherein the filter bellows is arranged in a reinforcement frame, and with at least one seal which is arranged circumferentially at least partially continuously at least in sections at an outer circumferential side of the filter medium at the inflow face or at the outflow face of the filter bellows and which, for example, by means of at least partially circumferentially extending interlocking ribs, is connected to the reinforcement frame, in particular connected to the reinforcement frame by foaming or molding. In this context, at the inflow face and/or at the outflow face of the filter bellows, a plurality of elongate adhesive sections are arranged along at least two adhesive tracks on the filter medium.

According to the invention, the filter element comprises strain-relief means for compensation of a length change of the adhesive tracks in relation to the filter medium and/or to the seal.

The filter bellows can be folded, for example, in a zigzag shape, to folds, with parallel fold edges sequentially arranged in a length extension of the filter bellows and extending between oppositely positioned end face edges of the filter bellows, respectively. In this context, a continuous reinforcement frame can be molded circumferentially around the filter bellows. Such a filter bellows is advantageously to be used as an air filter, for example, of an internal combustion engine, and represents an inexpensive and efficient solution of an air filter. Due to the molded frame, the filter bellows can be easily mounted and also exchanged, as needed.

The seal can be preferably a polyurethane (PUR) seal which can be produced by foaming or molding on the filter bellows in the region of the reinforcement frame.

For a flat filter, the flow direction is oriented, for example, perpendicularly to the inflow face and outflow face which are provided in case of a flat filter at oppositely positioned flat sides of the filter bellows. Preferably, the outflow face and the inflow face for a filter with erected folds form the surfaces in which the fold edges of folds of the filter medium are positioned, respectively.

One of the flow-through sides of the filter bellows can realize an inflow face for the fluid, the other flow-through side an outflow face. The fluid flows through the filter bellows from the inflow face to the outflow face. The flow-through sides can each be realized as flow-through faces wherein, in case of a folded filter bellows, the respective fold edges define the corresponding flow-through face.

According to the prior art, adhesive sections usually arranged at end faces are arranged as adhesive tracks extending continuously across the inflow face or outflow face on and transverse to the fold edges of the folds of the filter medium. In this way, the fold edges are clearly positioned at a fixed distance relative to each other, respectively. The adhesive tracks are applied either on an inflow face or outflow face formed by adjacently positioned fold edges or, transverse to the fold edges, on the not yet folded paper at which subsequently, with the adhesive still plastified, the folds are erected, wherein in the region of the fold edges on the inflow or outflow side the adhesive sections of adjacently positioned folds join each other so that, at the inflow and/or outflow face, a continuous, relatively strain-resistant connection extending transversely to the fold edges is produced. In both cases, a bead is produced that extends transversely to the folds, is continuous, and strong in the hardened state. Due to the strain-relief means according to the invention, it can be advantageously prevented that the adhesive tracks, by shrinkage of the adhesive over time, produce tensile stress transverse to the fold edges on the filter bellows. The advantage of the strain-relief means resides in that deformations generated by the shrinkage of the adhesive are reduced or prevented. Such deformations could result, for example, in positional changes of the functional elements such as seal faces or cause damage in an extreme case. Due to the strain-relief means, the shrinkage of the adhesive can however take place without causing disadvantageous stress effects in these regions.

Advantageously, the filter element can be a so-called flat filter element. In case of a flat filter element in the meaning of the invention, the filter medium is not closed to a hollow body.

The filter element according to the invention is not annular. The flow-through sides are positioned axially opposite each other in relation to an element axis. In contrast to this, in case of a hollow filter element, in particular a so-called round filter element, the filter medium is circumferentially closed and surrounds an interior. The filter element according to the invention can be planar or curved. In this context, an inflow face and/or an outflow face of the filter bellows for the fluid can be planar, curved, or stepped. The filter element can also be box-shaped. The filter bellows can have approximately the shape of a polyhedron. Advantageously, the filter bellows can be cubic, cuboid-shaped, pyramid-shaped, prism-shaped, wedge-shaped or the like. In this context, it is not required that all sides, in particular circumferential sides, of the filter bellows are planar. At least one side of the filter bellows can also extend at least partially curved, in particular parabolic and/or stepped. Oppositely positioned sides can extend parallel to each other. Alternatively or additionally, they can also extend at a slant or in another way non-parallel to each other. Advantageously, the inflow face and/or the outflow face can each extend at least in sections perpendicularly or at a slant to the element axis.

Advantageously, the inflow face and the outflow face can extend at least in sections at a slant to each other and/or at least in sections parallel to each other. Advantageously, at least one filter bellows can comprise a filter medium that is zigzag-shaped and/or corrugated. In this manner, the surface of the filter medium to be flowed through by the fluid can be enlarged in relation to the spatial expansion of the filter bellows.

Advantageously, fold edges of the filter medium can extend parallel to each other on oppositely positioned flow-through sides, in particular at an inflow face and/or at an outflow face.

Advantageously, at least one filter bellows can comprise relatively deep folds and/or variable fold heights. The expansion of a fold of the folded filter medium between an inflow-side fold edge and a neighboring outflow-side fold edge is referred to as fold height. In case of deep folds, the fold height, i.e., the height of the filter bellows in the region of the corresponding fold, is larger than a width and/or a length of the filter bellows perpendicular or transverse to the fold height.

The filter medium can comprise filter paper, filter nonwoven, meltblown, fabric and/or a different filter material that is suitable for filtering fluid, in particular air. Advantageously, the filter medium can be flexible, in particular foldable or bendable.

The filter bellows can comprise alternatively or additionally fluid-permeable, in particular air-permeable, filter foam.

The filter bellows can be realized at least partially as a massive block of filter material, in particular filter foam.

According to an advantageous embodiment, at least one adhesive section and at least one interruption of adhesive can be arranged as strain-relief means on each adhesive track, wherein in particular the interruptions of adhesive of neighboring adhesive tracks, in particular in relation to a transverse direction to the folds, can be arranged on different fold edges. Continuous adhesive tracks are thus divided into individual adhesive sections that are separated from each other. These interruptions of adhesive can be introduced expediently during manufacture of the adhesive tracks by interrupting the flow of adhesive. Preferably, the interruptions of adhesive can be arranged on the fold edges.

According to an advantageous embodiment, the interruptions of adhesive of neighboring adhesive tracks can be arranged without overlap in relation to a transverse direction relative to the folds. In other words, adjacently positioned adhesive tracks comprise preferably no interruptions of adhesive on the same fold edge. When the interruptions of adhesive are arranged displaced relative to each other in this way at the inflow face or outflow face, the overall stiffness of the filter bellows is beneficially relatively minimally affected so that the filter bellows remains stable even in regard to higher fluid pressures.

According to an advantageous embodiment, the uninterrupted adhesive sections can extend across at least five times, preferably at least ten times, particularly preferred at least fifteen times, as many folds as the interruptions of adhesive. Such a dimensioning of the adhesive sections in comparison to the interruptions of adhesive ensures in practical operation a satisfactory stability of the filter bellows while providing satisfactory strain relief at the same time.

According to an advantageous embodiment, the interruptions of adhesive can extend across at least, or precisely, one fold edge, preferably across at least, or precisely, two adjacently positioned fold edges. Preferably, at both sides of a plurality of or of all interruptions of adhesive, uninterrupted adhesive sections adjoin, respectively, which extend across at least five fold edges or at least across five times, preferably across at least ten times, particularly preferred at least fifteen times, as many fold edges as the interruptions of adhesive, provided they do not end with the last fold of the filter bellows. In this way, a sufficient stability of the filter bellows in relation to higher fluid pressures due to the flow through the filter medium is ensured also.

According to an advantageous embodiment, the adhesive tracks can be arranged equidistantly parallel to each other and/or the interruptions of adhesive can be arranged uniformly distributed across the inflow face and/or across the outflow face. Such an arrangement of the adhesive tracks and dimensioning of the adhesive sections in comparison to the interruptions of adhesive ensure in practical operation, as the fluid flows through the filter medium, a satisfactory stability of the filter bellows while providing simultaneously satisfactory strain relief.

According to an advantageous embodiment, the adhesive tracks can extend perpendicularly to the fold edges. In this way, a beneficial stability of the filter medium in relation to higher fluid pressures can be achieved even for increasing load of the filter medium by the deposited dirt particles filtered out of the fluid.

According to an advantageous embodiment, a sliding seat of the seal can be provided as a strain-relief means on at least one longitudinal side and/or a transverse side of the reinforcement frame, which longitudinal side and/or transverse side is oriented at a slant or perpendicularly to the adhesive tracks. By such a sliding seat of the seal, it can be achieved that the seal can move together with the movement of the filter bellows caused by shrinkage of the adhesive tracks, and no undesirable adhesive openings between filter medium and seal as leaks for the filtered fluid are generated. The seal tightness between the filter medium and the seal can thus be ensured over the service life of the filter element. Such a sliding seat of the seal is preferably arranged on at least one side parallel to the fold edges, particularly preferred at two sides parallel to the fold edges, of the reinforcement frame.

According to an advantageous embodiment, the reinforcement frame can comprise form fit means such as a plurality of openings or ribs, for example, interlocking ribs or the like. Preferably, at least one longitudinal side or one transverse side of the reinforcement frame can be designed without form fit or interlocking ribs. The seal is preferably sealtightly connected to the filter bellows and/or to the reinforcement frame surrounding the filter bellows, preferably formed thereon, for example, foamed on or molded on, and further preferred fixedly connected to the reinforcement frame by formed around, foamed around or molded around form fit means such as, for example, interlocking ribs. A sliding seat of the seal can thus be achieved in that on at least one longitudinal side or transverse side of the reinforcement frame these interlocking ribs are omitted so that the seal is resting only on the smooth front side of the reinforcement frame and can thus move easily.

According to an advantageous embodiment, the seal can be arranged slidably at the longitudinal side or the transverse side. Due to the omission of form fit elements such as interlocking ribs, the seal is connected to the reinforcement frame at these sides only slightly, in particular not with form fit and not interlocked in direction transverse to the fold edges and can thus move together with the filter bellows upon movement of the filter bellows due to shrinkage of the adhesive tracks. In this way, accidental adhesive openings between filter medium and seal are avoided which can lead to leaks for the fluid to be filtered.

According to a further aspect, the invention concerns a filter system for filtering a fluid with a filter housing, which comprises at least one inlet for inflow of the fluid flow and at least one outlet for outflow of the purified fluid flow, and with a filter element for filtering the fluid exchangeably arranged in the filter housing between a raw side and a clean side, with at least one filter bellows with a filter medium folded in a zigzag shape, with a raw-side inflow face that is formed by the raw-side fold edges, and a clean-side outflow face that is formed by the clean-side fold edges, which filter bellows is arranged in a clean-side reinforcement frame, and with at least one seal, which is arranged circumferentially at least partially continuously at least in sections at an outer circumferential side of the filter medium at the inflow face or at the outflow face of the filter bellows and which, by means of at least partially circumferentially extending interlocking ribs, is connected to the reinforcement frame, in particular connected by foaming or molding to the reinforcement frame. In this context, at the inflow face and/or at the outflow face of the filter bellows, a plurality of elongate adhesive sections are arranged along at least two adhesive tracks on the filter medium.

According to the invention, the filter element comprises strain-relief means for compensation of a length change of the adhesive tracks in relation to the filter medium and/or to the seal.

The filter bellows can be folded, for example, in a zigzag shape, to folds, with parallel fold edges sequentially arranged in a length extension of the filter bellows and extending between oppositely positioned end face edges of the filter bellows, respectively. In this context, a continuous reinforcement frame can be molded circumferentially around the filter bellows. Such a filter bellows is advantageously to be used as air filter, for example, of an internal combustion engine, and provides an inexpensive and efficient solution of an air filter. Due to the molded-on frame, the filter bellows can be easily mounted and also exchanged as needed.

The seal can be preferably a polyurethane (PUR) seal which can be produced by foaming or molding on the filter bellows in the region of the reinforcement frame.

For a flat filter, the flow direction is oriented, for example, perpendicularly to the inflow face and outflow face which are provided in case of a flat filter at oppositely positioned flat sides of the filter bellows. Preferably, the outflow face and the inflow face for a filter with erected folds form the surfaces in which the fold edges of folds of the filter medium are positioned, respectively.

One of the flow-through sides of the filter bellows can realize an inflow face for the fluid, the other flow-through side an outflow face. The fluid flows through the filter bellows from the inflow face to the outflow face. The flow-through sides can each be realized as flow through faces wherein, in case of a folded filter bellows, the respective fold edges define the corresponding flow-through face.

According to the prior art, adhesive sections usually arranged at end faces are arranged as adhesive tracks extending continuously across the inflow face or outflow face on the fold edges of the folds of the filter medium. By means of the strain-relief means in accordance with the invention, it can be advantageously prevented that the adhesive tracks, due to shrinkage of the adhesive over time, exhibit adhesive openings which then can lead to leaks for the fluid to be purified between the seal and the filter medium. The advantage of strain-relief means resides in that no longer relatively wide detachment effects are produced due to the shrinkage of the adhesive in the critical connection region of the filter bellows to the seal. The shrinkage of the adhesive can still take place so that no corresponding strains in these regions occur.

According to an advantageous embodiment, a cyclone pre-separator can be provided in the filter housing upstream in fluid flow direction in front of the filter element and/or a safety element can be provided downstream in fluid flow direction behind the filter element.

Advantageously, the filter can be configured as a multi-stage filter, in particular two-stage compact air filter. Advantageously, at least one filter element can be arranged in flow communication downstream of at least one particle separation device, in particular a cyclone pre-separator. The at least one particle separation device can be part of the filter or connected externally upstream thereto, in particular as a pre-separator. An external pre-separator can be arranged outside of a motor compartment. Advantageously, at least one inlet opening, at least one outlet opening, and optionally a particle separation device can be arranged substantially linearly. In this manner, in accordance with the filter, the fluid can flow through substantially along in particular a housing axis of the filter housing.

According to an advantageous embodiment, the raw side can be separated from the clean side by means of the seal of the filter element for properly installed filter element. In this manner, a reliable purification of the inflowing fluid can be ensured with a long service life of the filter element.

According to an advantageous embodiment, the filter element can be designed as a slide-in filter element that is inserted or insertable transversely to the main flow axis of the fluid into the filter housing. In this way, an expedient exchange of the filter element in case of effected loading is possible. Also, the duration of a servicing interval with standstill of the internal combustion engine or of the motor vehicle can be reduced.

The described filter system can be used advantageously as air filter, in particular as air filter of an internal combustion engine or as interior air filter, in particular of a motor vehicle.

The invention can be employed in motor vehicles, construction/agricultural machines, compressors, industrial motors or other apparatus with internal combustion engine. Vehicles in the meaning of the invention can be landbound vehicles, watercraft and/or aircraft.

Advantageously, the motor vehicle can be a passenger car, a truck, a motorcycle, a bus, a tractor, an agricultural vehicle and/or a construction vehicle or the like.

The invention can be advantageously part of an intake manifold of an internal combustion engine. The filter can serve for purifying the combustion air which is supplied to the internal combustion engine. The invention is however not limited to an air filter of an intake manifold of an internal combustion engine of a motor vehicle. Instead, it can also be employed in different types of air systems of motor vehicles or other machines, in particular agricultural machines or construction machines. The air filter can be used also outside of the automotive technology, in particular in industrial motors.

In other respects, the features and advantages disclosed in connection with the filter element according to the invention, the element frame according to the invention, the filter bellows according to the invention, the filter housing according to the invention, and the filter according to the invention and their respective advantageous embodiments apply mutually among each other, and vice versa. The individual features and advantages can be combined mutually with each other, of course, wherein further advantageous effects may result that go beyond the sum of the individual effects.

BRIEF DESCRIPTION OF THE DRAWINGS

Further advantages result from the following drawing description. In the drawings, embodiments of the invention are illustrated. The drawings, the description, and the claims contain numerous features in combination. A person of skill in the art will consider the features expediently also individually and combine them to expedient further combinations.

PREFERRED EMBODIMENTS OF THE INVENTION

In the Figures, same or same-type components are identified with same reference characters. The Figures show only examples and are not to be understood as limiting.

Figure 1:
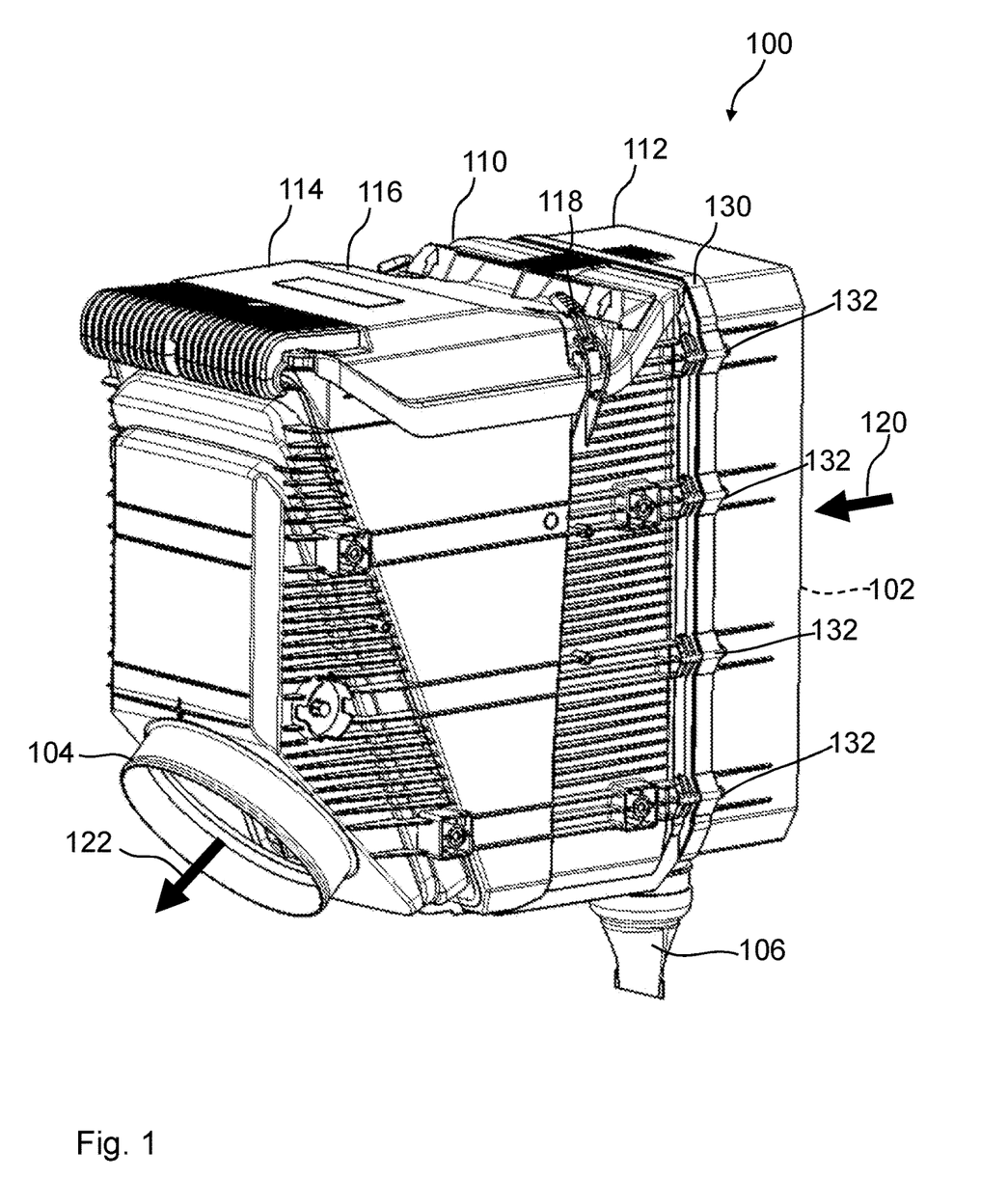
FIG. 1 shows an isometric illustration of a filter system with mounted filter element according to an embodiment of the invention.
Figure 2:
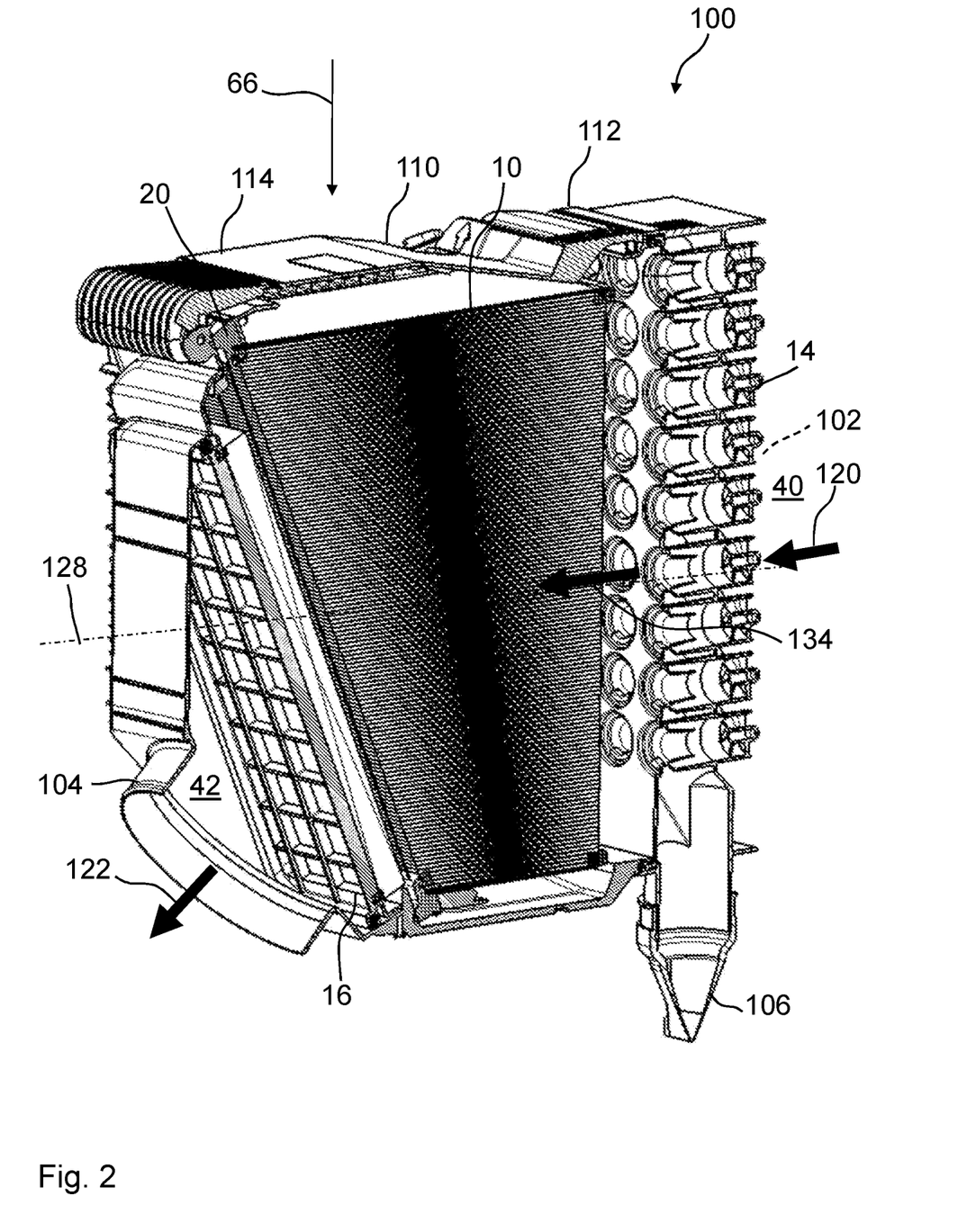
FIG. 2 shows an isometric illustration of the filter system according to FIG. 1 in a longitudinal section.

FIG. 1 shows an isometric illustration of a filter system 100 for filtering a fluid with mounted filter element 10 according to an embodiment of the invention while in FIG. 2, to improve understanding, an isometric illustration of the filter system 100 is illustrated in longitudinal section.

The filter system 100 comprises a filter housing 110 which comprises at least one inlet 102 (not visible) for inflow of the fluid flow 120 and at least one outlet 104 for outflow of the purified fluid flow 122. The filter housing 110 comprises a housing bottom part 114 and a housing top part 112 which are joined along a flange 130 by means of screw connections 132. In the filter housing 110, between a raw side 40 and a clean side 42, a filter element 10 for filtering the fluid is exchangeably arranged. The filter element 10 can be inserted into the filter housing 110 and removed again via a housing cover 116 which can be seal-tightly connected to the filter housing 110 by means of clamping closures 118. The inflow direction of the fluid to be purified as well as the outflow direction are identified by arrows 120, 122.

In longitudinal section of the filter system 100 in FIG. 2, the filter element 10, also sectioned, can be seen which is inserted into the filter housing 110. Moreover, a cyclone pre-separator 14 can be seen where coarser dirt particles can be filtered out of the fluid flow. The separated dirt particles can be discharged through the dirt outlet 106 from the filter housing. The flow direction 134 of the filter element 10 is indicated by an arrow. Downstream, before the purified fluid can exit from the filter housing 110 through the outlet 104, the fluid flows through a safety element 16 which, for example, is embodied as a flat bellows in order to protect, even when exchanging the filter element 10, the clean side 42 from possible soiling by inflow of unpurified fluid or other dirt particles. The safety element 16 covers the outlet 104 completely.

Figure 3:
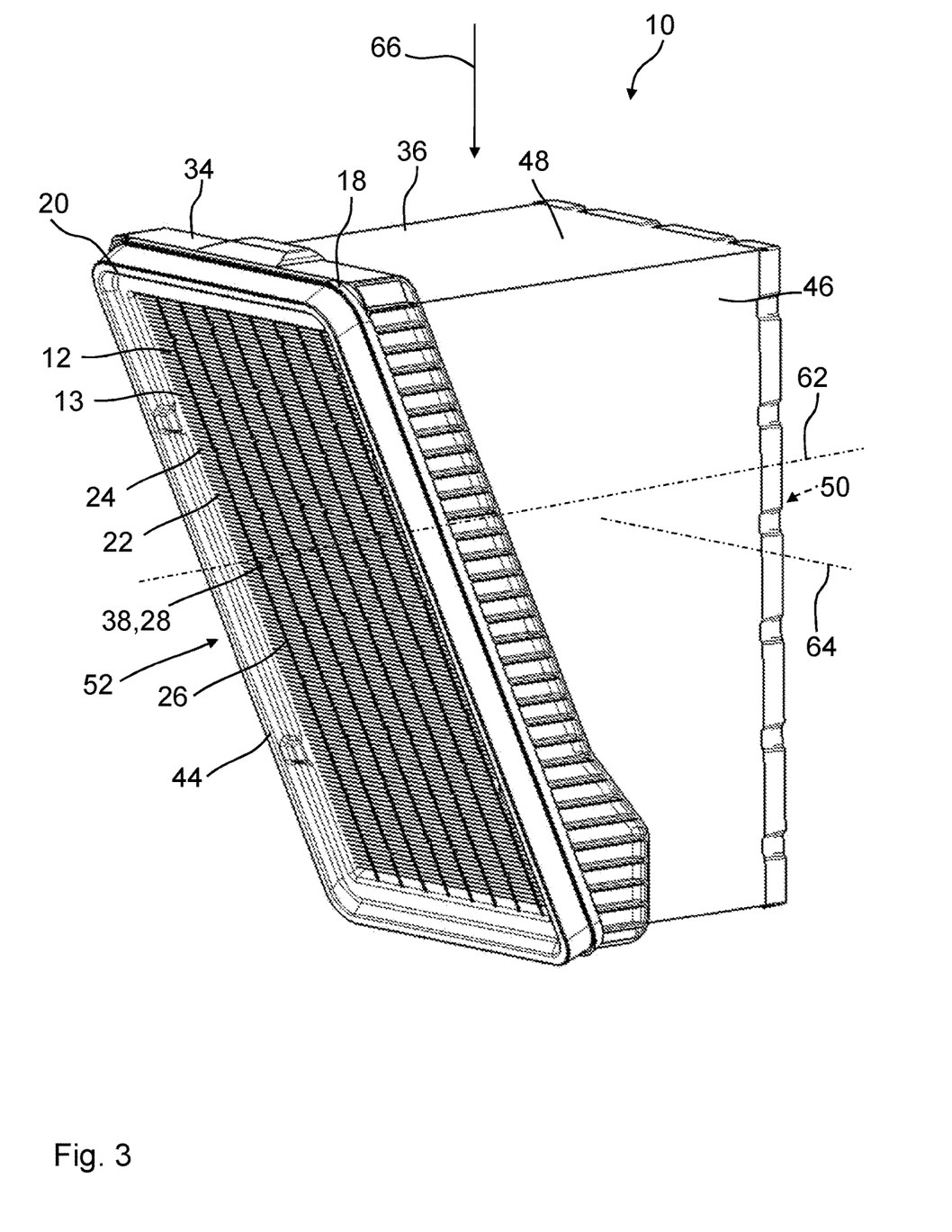
FIG. 3 shows an isometric illustration of a filter element according to an embodiment of the invention.

The filter element 10 inserted into the filter system 100 as illustrated in FIGS. 1 and 2 can be seen in an isometric illustration in FIG. 3. The filter element 10 comprises a filter bellows 12 which is inserted into an element frame 36.

The filter element 10 is designed as a slide-in filter element that can be inserted or is insertable transverse to the main flow axis 128 (see FIG. 2) of the fluid into the filter housing 110.

The filter bellows 12 comprises a filter medium 13 folded in a zigzag shape. The filter bellows 12 is of a rectangular shape viewed in direction of the main axis 62. Viewed in direction of a transverse axis 64, the filter bellows 12 has approximately the shape of a rectangular trapezoid. A raw-side inflow face 50 of the filter bellows 12 extends parallel to a flow center plane, i.e., perpendicularly to the main axis 62. A clean-side outflow face 52 extends parallel to the transverse axis 64 and at a slant to the flow center plane, i.e., at a slant to the inflow face 50.

The filter bellows 12 tapers, viewed in the installation direction 66, toward its forward transverse side. The fold edges 24 of the filter medium 13 at the inflow face 50 and at the outflow face 52 extend parallel to the transverse axis 64, respectively. The fold edges 24 span the inflow face 50 or the outflow face 52, respectively. The height of the folds 22 of the folded filter medium 13 in the direction toward the main axis 62 decreases from the transverse side of the filter bellows 12 that is to the rear in relation to the installation direction 66 to its forward transverse side. The filter bellows 12 has thus variable fold heights.

The outflow face 52 is surrounded by the seal 20. By means of the seal 20 of the filter element 10, the raw side 40 is separated from the clean side 42 of the filter element 10 when the filter element 10 is properly installed.

The seal 20 is made of polyurethane. It is elastic. The seal 20 is foamed onto the end face of the filter medium 13. The seal 20 projects past the filter medium 13 radially outwardly and in axial direction in relation to the main axis 62. An outflow-side sealing lip of the seal 20 at the end face forms a circumferentially continuous seal surface 44 in relation to the main axis 62. The seal surface 44 is positioned in the installed state at a housing-side seal surface.

At the rear side of the seal 20 that is axially facing away from the seal surface 44 in relation to the main axis 62, a reinforcement frame 18 of plastic material is embedded in the seal track of the seal 20. The reinforcement frame 18 extends parallel to the seal plane and parallel to the seal surface 44. The reinforcement frame 18 is circumferentially continuous in relation to the main axis 62. A seal rear side of the seal 20, which is axially facing away from the seal surface 44 in relation to the main axis 62, extends in a plane parallel to the plane of the seal surface 44. When the filter element 10 is installed, the respective planes of the seal surface 44 and of the seal rear side extend parallel to the seal plane of the housing-side seal surface.

At the outflow face 52, the element frame 36 comprises the seal support device 34. The seal support device 34 is arranged at the outflow-side rim of the element frame 36. The seal support device 34 extends circumferentially continuously at the outer side of the filter element 10 in relation to the main axis 62. The seal support device 34 is connected, forming one piece, with the longitudinal walls 46 and the transverse walls 48 of the element frame 36.

At the inflow face 50 and/or at the outflow face 52 (not visible) of the filter bellows 12, a plurality of elongate adhesive sections 28 are arranged along at least two adhesive tracks 26 on the filter medium 13 in order to stabilize the folds 22 of the filter medium 13 mechanically against the fluid pressure of the flowing fluid.

In FIG. 3 and the following Figures, only one of the adhesive tracks 26 is provided with reference characters for reasons of simplification.

For compensation of a length change of the adhesive tracks 26 in relation to the filter medium 13 and/or to the seal 20, the filter element 10 comprises strain-relief means 38 in accordance with the invention.

Figure 4:
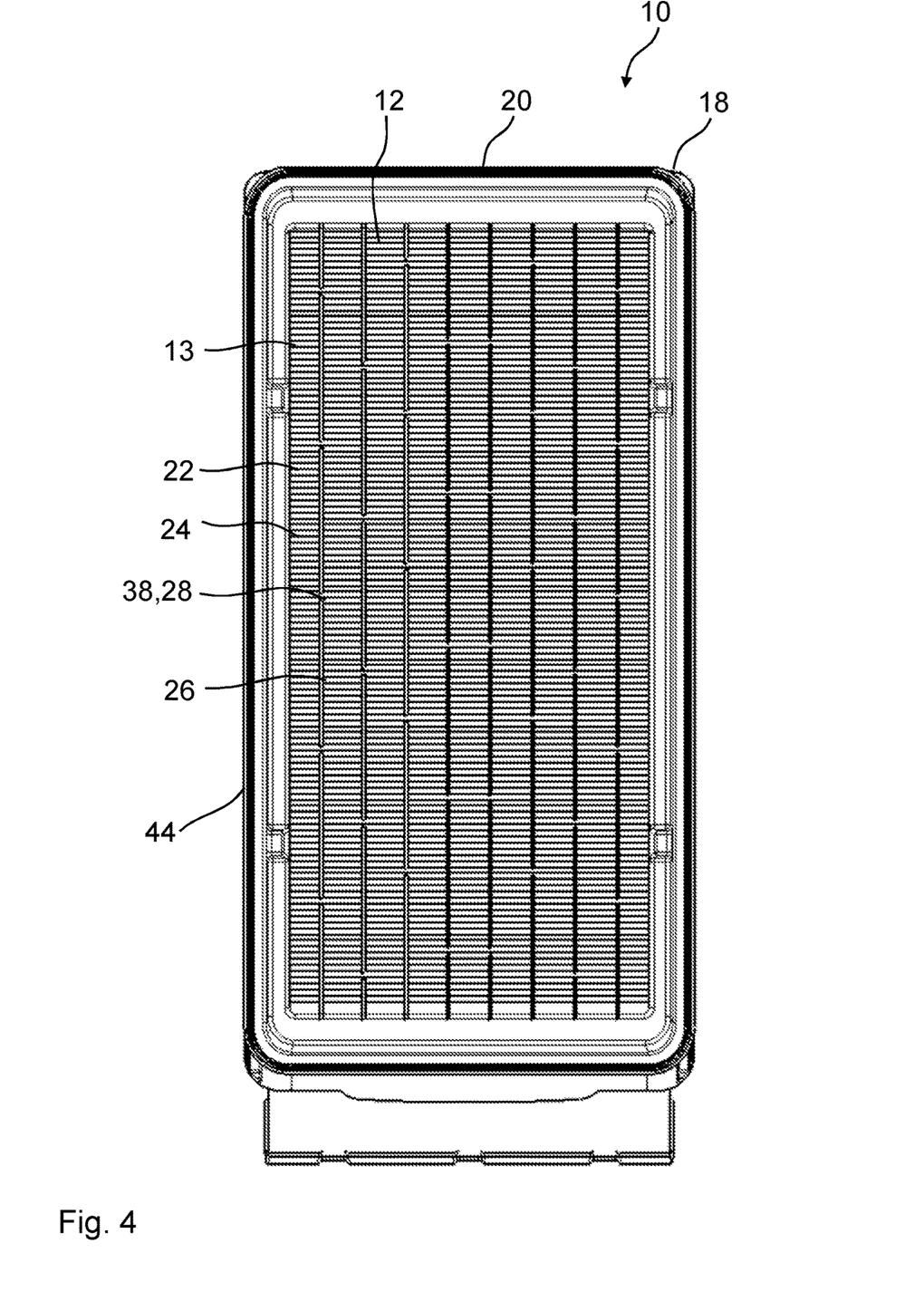
FIG. 4 shows a plan view of an outflow face of the filter element according to FIG. 3.
Figure 5:
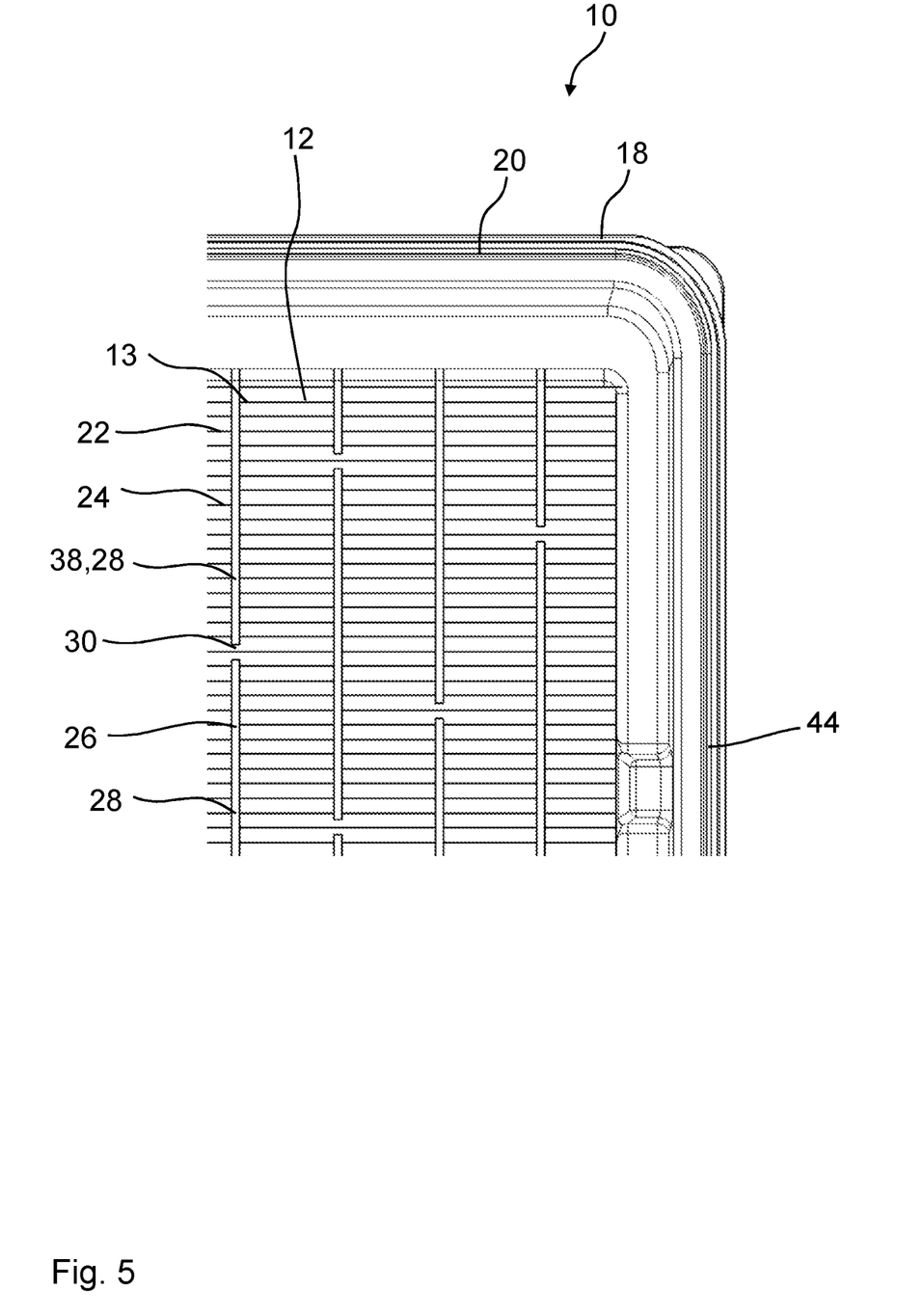
FIG. 5 shows an enlarged detail of the plan view of the outflow face of the filter element according to FIG. 4.

FIG. 4 shows in this respect a plan view of the outflow face 52 of the filter element 10 according to FIG. 3, while in FIG. 5 an enlarged detail of the plan view of the outflow face 52 is illustrated.

In the first embodiment illustrated in FIGS. 3 to 5, at least one adhesive section 28 and at least one interruption of adhesive 30 are arranged as a strain-relief means 38 on each adhesive track 26, wherein in particular the interruptions of adhesive 30 of neighboring adhesive tracks 26 are arranged on different fold edges 24 in relation to a transverse direction to the folds 22.

As can be seen in particular in FIG. 5, the interruptions of adhesive 30 of neighboring adhesive tracks 26 are arranged without overlap in relation to a transverse direction relative to the folds 22. The uninterrupted adhesive sections 28 can advantageously extend across at least five times, preferably across at least ten times, particularly preferred across at least fifteen times, as many folds 22 as the interruptions of adhesive 30. The interruptions of adhesive 30 can extend across a fold edge 24 and preferably extend across a fold 22.

The adhesive tracks 26 are arranged parallel to each other equidistantly and they extend perpendicularly to the fold edges 24. The interruptions of adhesive 30 are arranged substantially uniformly distributed across the outflow face 52.

Figure 6:
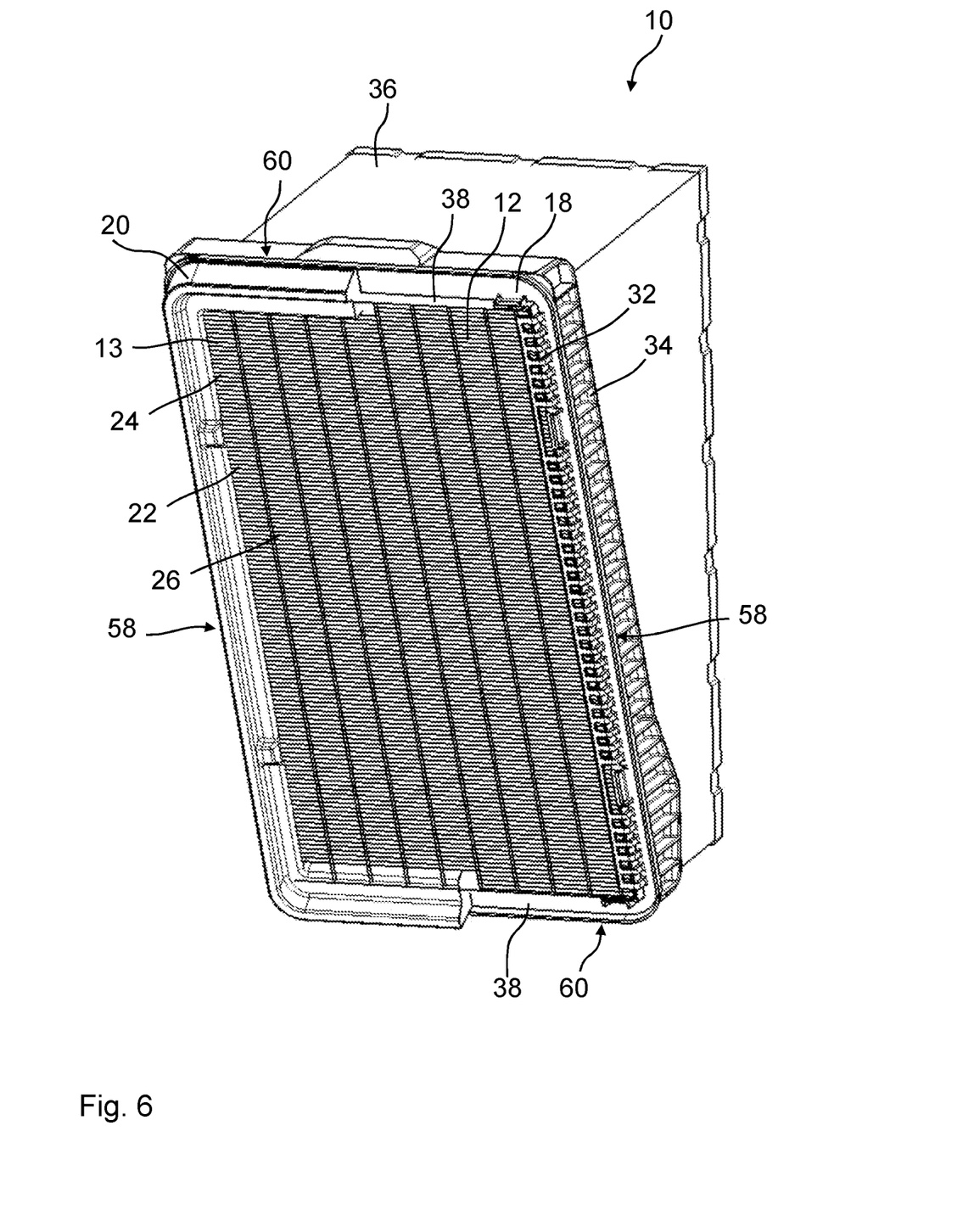
FIG. 6 shows an isometric illustration of a filter element according to a further embodiment of the invention.

In FIG. 6, an isometric illustration of a filter element 10 according to a further embodiment of the invention is illustrated in which, as a strain-relief means 38, a sliding seat of the seal 20 is provided on at least one transverse side 60 of the reinforcement frame 18 which is oriented perpendicularly to the adhesive tracks 26. The seal 20 is partially sectioned and thus illustrated only on one side of the outflow face 52 of the filter element 10. In this context, in the reinforcement frame 18 which comprises interlocking ribs 32, the transverse sides 60 of the reinforcement frame 18 are embodied without interlocking ribs. Since the seal 20 is not fixedly connected at these transverse sides 60 with interlocking ribs 32 and thus with the reinforcement frame by foaming, the seal 20 is thus arranged at the transverse sides 60 to be slidable and can slide on the reinforcement frame 18. In this way, the seal 20 can move relative to the transverse sides 60 of the reinforcement frame 18 upon movements of the filter medium 13 as a result of shrinkage of the adhesive tracks 26. In this manner, the adhesive openings between filter medium 13 and seal 20 which can lead to leaks for the fluid to be filtered can be avoided. The seal tightness between the filter medium 13 and the seal 20 can thus be ensured over the service life of the filter element 10.

Figure 7:
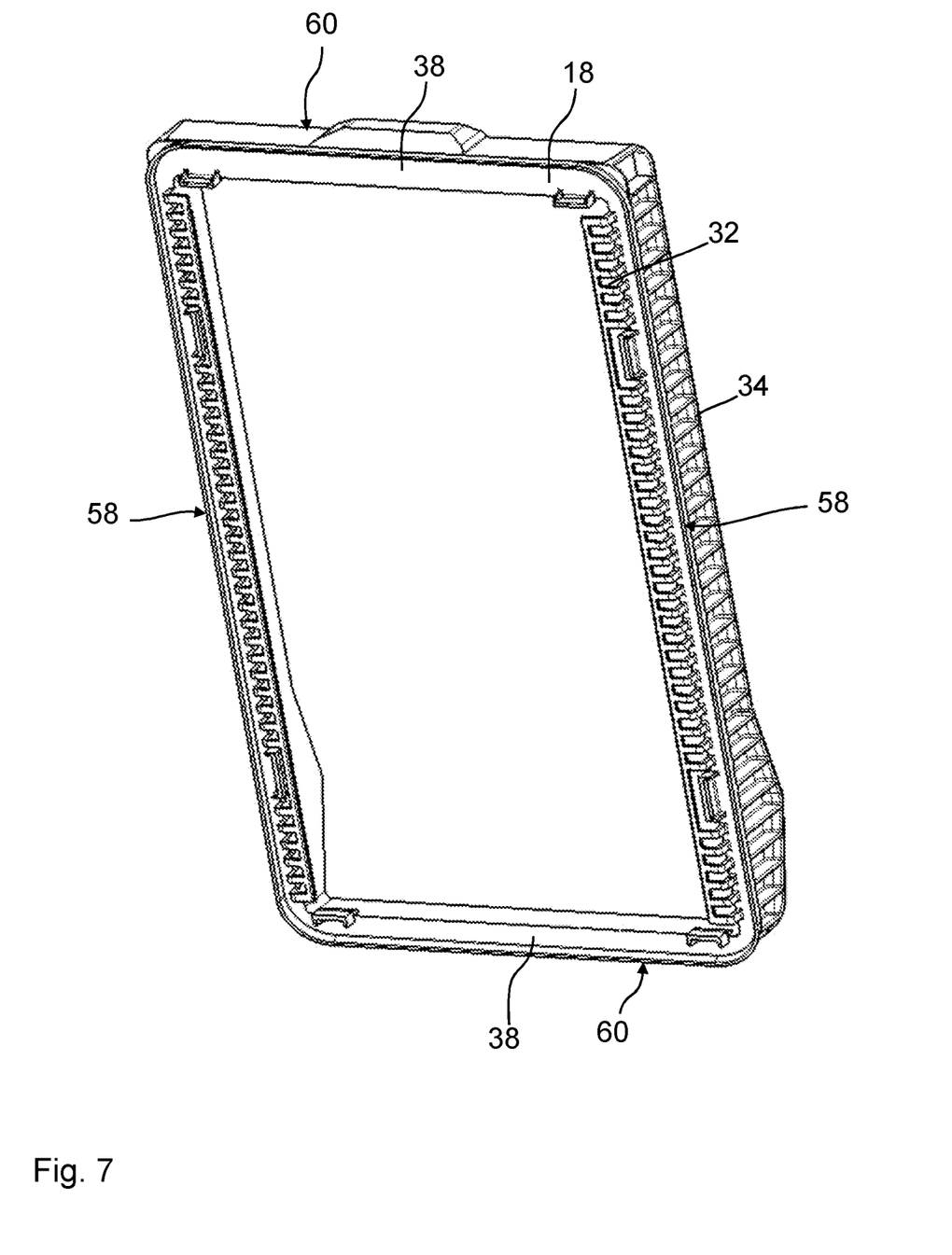
FIG. 7 shows an isometric view of a reinforcement frame with a seal support device of the filter element according to FIG. 6.

FIG. 7 shows in this respect an isometric view of a reinforcement frame 18 which is resting against the seal support device 34 of the filter element 10. As can be seen, the transverse sides 60 of the reinforcement frame 18 have no interlocking ribs 32 so that the seal 20 of the filter bellows 12 can be displaced thereon.

Figure 8:
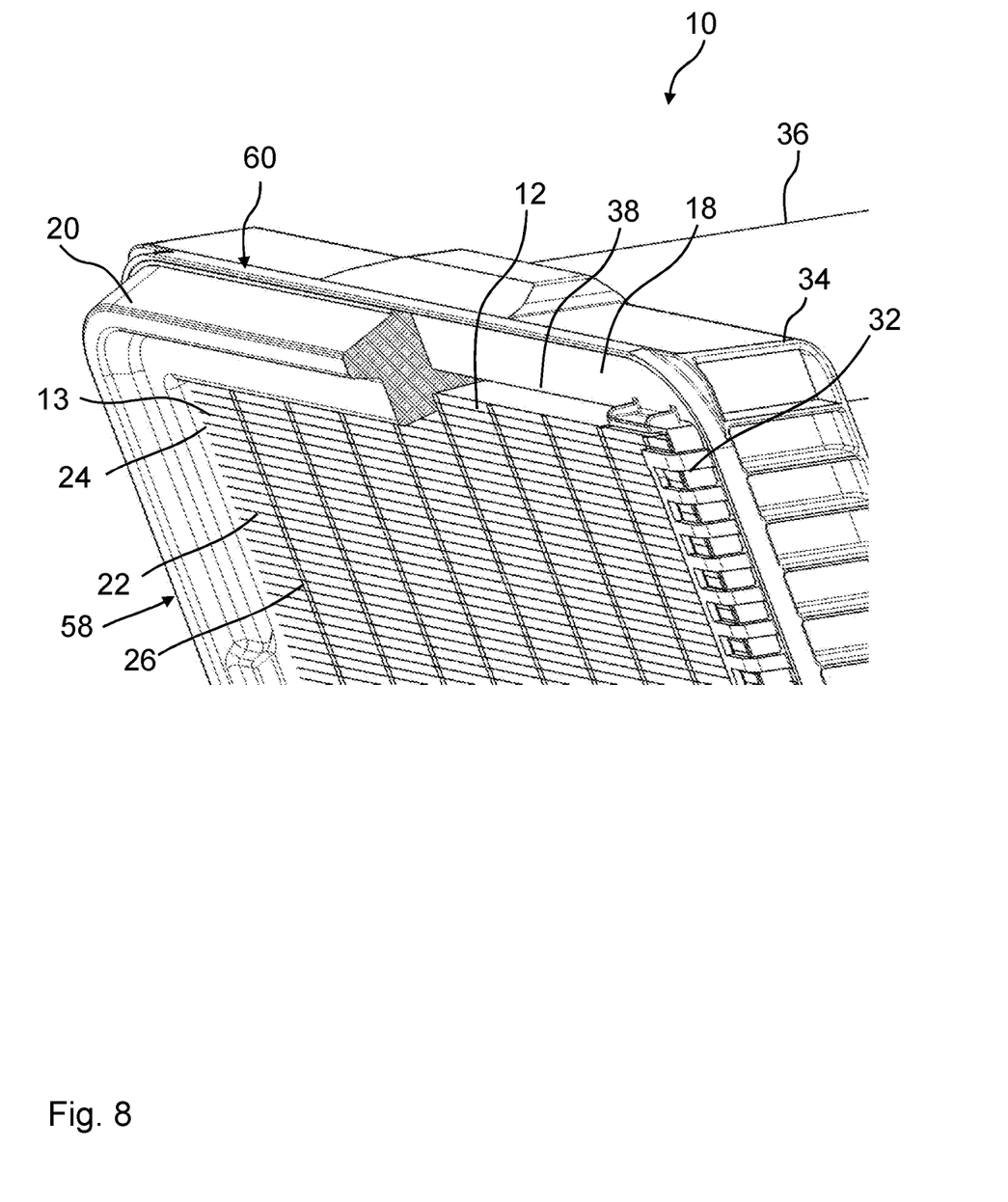
FIG. 8 shows an enlarged detail of the isometric illustration of the filter element according to FIG. 6.

FIG. 8 shows an enlarged detail of the isometric illustration of the filter element 10 according to FIG. 6. The seal 20 in this respect is partially sectioned and thus illustrated only on one side of the outflow face 52 of the filter element 10 so that the interlocking ribs 32 that are missing at the transverse sides 60 of the reinforcement frame 18 can be seen.

In an alternative embodiment, the strain-relief means 38 of the missing interlocking ribs 32 can also be provided on at least one longitudinal side 58 which is oriented at a slant or perpendicularly to the adhesive tracks 26.

What is claimed is:

1. A filter element for filtering a fluid, the filter element comprising:
    a frame;
    a filter bellows comprising a filter medium folded in a zigzag shape to folds, the filter bellows comprising
        an inflow face at a raw side of the filter bellows and
        an outflow face at a clean side of the filter bellows,
        wherein the filter bellows is arranged in the frame;
    a seal arranged circumferentially at least partially continuously at least in sections at an outer circumferential side of the filter medium at the inflow face of the filter bellows or at the outflow face of the filter bellows;
    a plurality of elongate adhesive sections arranged along at least two adhesive tracks on the filter medium at the inflow face of the filter bellows and/or at the outflow face of the filter bellows;
    strain-relief means configured to compensate a length change of the at least two adhesive tracks in relation to the filter medium and/or to the seal;
    wherein the strain-relief means includes a sliding seat of the seal on at least one longitudinal side and/or at least one transverse side of the frame,
    wherein the at least one longitudinal side and/or at least one transverse side of the frame is oriented at a slant or perpendicularly to the at least two adhesive tracks.

2. The filter element according to claim 1, wherein
    the filter bellows is connected to the frame at the inflow face of the filter bellows and/or at the outflow face of the filter bellows.

3. The filter element according to claim 1, wherein
    the seal is connected to the filter bellows.

4. The filter element according to claim 1, wherein
    the seal is connected seal-tightly to the filter bellows by casting on, foaming on or molding on.

5. The filter element according to claim 1, wherein
    the at least two adhesive tracks are arranged parallel to each other.

6. The filter element according to claim 1, wherein
    the at least two adhesive tracks are arranged parallel and equidistantly to each other.

7. The filter element according to claim 1, wherein
    the at least two adhesive tracks extend perpendicularly to fold edges of the folds of the filter bellows.

8. The filter element according to claim 1, wherein
    the frame comprises interlocking ribs,
    wherein the at least one longitudinal side and/or one transverse side of the frame comprises no interlocking ribs.

9. The filter element according to claim 8, wherein
    the seal is slidably arranged on a longitudinal side of the frame or on a transverse side of the frame.

10. A filter system for filtering a fluid, the filter system comprising:
    a filter housing comprising
        at least one inlet for inflow of a fluid flow and
        at least one outlet for outflow of the purified fluid flow;
    a filter element according to claim 1, exchangeably arranged in the filter housing between a raw side of the filter element and a clean side of the filter housing.

11. The filter system according to claim 10, further comprising
    a cyclone pre-separator arranged in the filter housing upstream in front of the filter element in a fluid flow direction of the fluid flow.

12. The filter system according to claim 10, further comprising
    a safety element arranged downstream behind the filter element in a fluid flow direction of the fluid flow.

13. The filter system according to claim 10, wherein
    the seal of the filter element separates the raw side of the filter housing from the clean side of the filter housing when the filter element is installed in the filter housing.

14. The filter system according to claim 10, wherein
    the filter element is a slide-in filter element configured to be inserted into the filter housing transverse to a main flow axis of the fluid.

15. A filter element for filtering a fluid, the filter element comprising:
    a frame;
    a filter bellows comprising a filter medium folded in a zigzag shape to folds, the filter bellows comprising
        an inflow face at a raw side of the filter bellows and
        an outflow face at a clean side of the filter bellows,
        wherein the filter bellows is arranged in the frame;
    a seal arranged circumferentially at least partially continuously at least in sections at an outer circumferential side of the filter medium at the inflow face of the filter bellows or at the outflow face of the filter bellows;
    a plurality of elongate adhesive sections arranged along at least two adhesive tracks on the filter medium at the inflow face of the filter bellows and/or at the outflow face of the filter bellows;
    a strain-relief means configured to compensate a length change of the at least two adhesive tracks in relation to the filter medium and/or to the seal;
    wherein the frame is a reinforcement frame,
    wherein the seal is connected to the reinforcement frame by form fit elements,
    wherein the form fit elements are interlocking ribs of the reinforcement frame,
    wherein the interlocking ribs are arranged at least partially about a circumference of the reinforcement frame.

16. The filter element according to claim 15, wherein
    the seal is connected to the reinforcement frame by casting on, foaming on, or molding on.

17. The filter element according to claim 15, wherein
    the strain-relief means, on each one of the at least two adhesive tracks, comprises
        at least one of the plurality of elongate adhesive sections and
        at least one interruption of adhesive.

18. The filter element according to claim 17, wherein
    the at least two adhesive tracks include
        a first adhesive track and
        a second adhesive track neighboring the first adhesive track, wherein the at least one interruption of adhesive arranged on the first adhesive track and the at least one interruption of adhesive arranged on the second adhesive track are arranged on different fold edges of the folds of the filter bellows, respectively, in a transverse direction oriented transversely to the folds of the filter bellows.

19. The filter element according to claim 17, wherein the at least two adhesive tracks include
   a first adhesive track and
   a second adhesive track neighboring the first adhesive track,
   wherein the at least one interruption of adhesive arranged on the first adhesive track and the at least one interruption of adhesive arranged on the second adhesive track are arranged without overlap in relation to a transverse direction oriented transversely to the folds of the filter bellows.

20. The filter element according to claim 17, wherein said at least one of the plurality of elongate adhesive sections extends across at least five times as many folds of the filter bellows as the at least one interruption of adhesive.

21. The filter element according to claim 17, wherein the at least one interruption of adhesive extends across one fold edge of the folds of the filter bellows.

22. The filter element according to claim 17, wherein the at least one interruption of adhesive extends across one of the folds of the filter bellows.

23. The filter element according to claim 17, wherein the strain relief means, on each one of the at least two adhesive tracks, comprise a plurality of said at least one interruption of adhesive arranged uniformly distributed across the inflow face of the filter bellows and/or across the outflow face of the filter bellows.

* * * * *